United States Patent [19]

Mignien

[11] Patent Number: 4,545,645
[45] Date of Patent: Oct. 8, 1985

[54] CONNECTION JOINING THE ENDS OF TWO UNDER-WATER OPTICAL FIBER CABLES AND A METHOD OF MANUFACTURING SAME

[75] Inventor: Georges Mignien, Calais, France

[73] Assignee: Les Cables de Lyon, Clichy, France

[21] Appl. No.: 482,646

[22] Filed: Apr. 6, 1983

[30] Foreign Application Priority Data

Apr. 9, 1982 [FR] France .................. 82 06242

[51] Int. Cl.[4] ........................... G02B 5/14
[52] U.S. Cl. .................. 350/96.21; 350/96.20; 350/96.22; 350/96.23; 174/70 R
[58] Field of Search ........... 350/96.10, 96.20, 96.21, 350/96.22, 96.23; 174/70 R, 70 S

[56] References Cited

U.S. PATENT DOCUMENTS

| | | | |
|---|---|---|---|
| 4,227,770 | 10/1980 | Gunn | 350/96.23 |
| 4,252,405 | 2/1981 | Oldham | 350/96.23 |
| 4,264,128 | 4/1981 | Young | 350/96.20 |
| 4,345,816 | 8/1982 | Nakai et al. | 350/96.20 |
| 4,348,076 | 9/1982 | Oldham | 350/96.21 |
| 4,389,088 | 6/1983 | Trezequet | 350/96.23 |
| 4,412,878 | 11/1983 | Guazzo | 350/96.23 |

FOREIGN PATENT DOCUMENTS

| | | | |
|---|---|---|---|
| 54-36949 | 3/1979 | Japan | 350/96.23 |
| 54-106251 | 8/1979 | Japan | 350/96.23 |
| 55-155305 | 12/1980 | Japan | 350/96.23 |
| 56-130708 | 10/1981 | Japan | 350/96.23 |
| 2018454 | 10/1979 | United Kingdom | 350/96.23 |
| 1592192 | 7/1981 | United Kingdom | 350/96.23 |

*Primary Examiner*—William L. Sikes
*Assistant Examiner*—Brian M. Healy
*Attorney, Agent, or Firm*—Sughrue, Mion, Zinn Macpeak & Seas

[57] ABSTRACT

A connection for joining the ends of two under-water optical fiber cables each comprising: an optical core constituted by a carrier wire covered by a helically grooved plastics rod with optical fibers inserted in its grooves; a protective tape surrounding the optical core; a steel wire arch assembly; a copper tube drawn down over the arch assembly; and a plastics insulating sheath.

Said connection includes two smooth rods (22, 22') glued to the ends of each cable on the carrier wire (2, 2') round which the optical fibers (4, 4') are wound, the fibers being welded one-to-one and protected by tapes (23, 23'), two split tubes (24, 24') covering the optical fibers wrapped in tape at the ends of each cable, a sheath (19) around which the ends of each arch assembly are formed again into cables and a sleeve (12) glued and/or crimped on the ends of each arch assembly.

12 Claims, 4 Drawing Figures

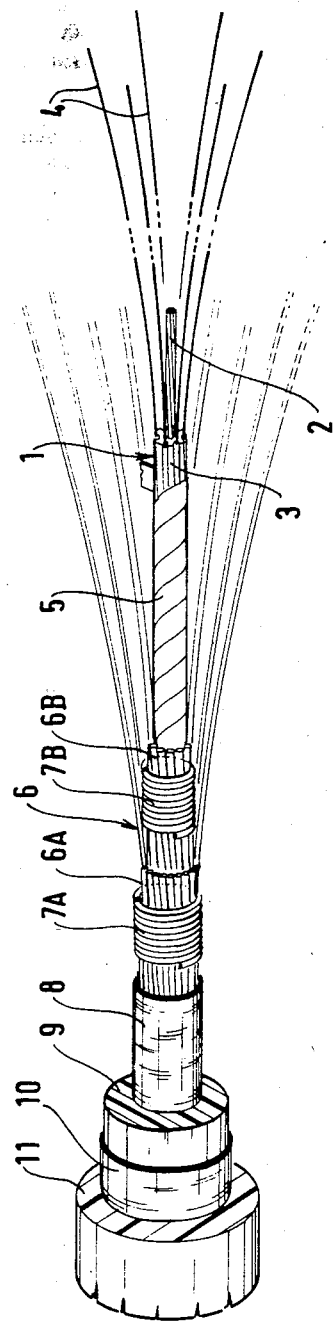
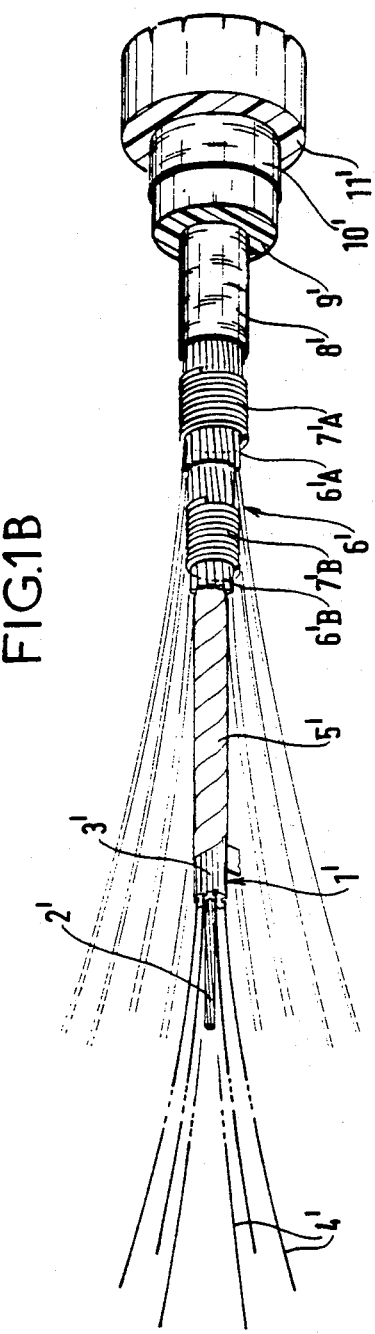

CONNECTION JOINING THE ENDS OF TWO UNDER-WATER OPTICAL FIBER CABLES AND A METHOD OF MANUFACTURING SAME

The present invention relates to a connection joining the ends of two under-water optical fiber cables, each cable comprising an optical core constituted by a carrier wire covered by a helically grooved plastics rod having optical fibers received in its the grooves; a protective tape surrounding the optical core; a steel wire arch assembly; and an insulating sheath made of a thermoplastic substance.

It also relates to a method of manufacturing such a connection.

BACKGROUND OF THE INVENTION

The Applicant's French Patent application No. 81 24 514 describes various connections for joining two cable ends to repair a damaged cable. These connections are formed by connection boxes which take up an appreciable volume and with an outside diameter of about 150 mm and a length of about 1.30 m.

Further, said connection box is completely rigid. This makes it less easy for the box to pass a davit when winding said cable. These boxes can be used only for such repairs as may be necessary after complete manufacture of the cable.

Preferred embodiments of the present invention remedy such drawbacks, by providing a connection and a method of connecting which allows a cable to be repaired during its various manufacturing steps. Repairs are made after insulation with a first thermoplastic insulating sheath.

Further, such preferred embodiments allow a connection to be made which maintains the geometric and dimensional appearance of the cable without increasing its rigidity, thus making it easier for the repaired cable to pass on a davit.

SUMMARY OF THE INVENTION

The present invention provides a connection joining the ends of two under-water optical fiber cables, each cable comprising an optical core constituted by a carrier wire covered by a helically grooved plastics rod having optical fibers received in its grooves; a protective tape surrounding the optical core; a steel wire arch assembly; and an insulating sheath made of a thermoplastic substance; wherein the connection includes:

a. two plastics rods glued at the ends of each cable to the carrier wire around which the ends of optical fibers are wound, said rods being welded individually to each other and being protected by two tapes;

b. two split plastics tubes covering the optical fibers which are surrounded with tape at the ends of each cable;

c. a sheath around which the ends of each arch assembly are reconstituted; and d. a sleeve glued and/or crimped onto the ends of each arch assembly.

Advantageously, the space left free between the ends of each arch assembly, the sheath and the sleeve as well as the ends of the sleeve are filled with glue.

In the method of manufacturing a connection according to the invention:

a. the insulating sheath and the drawn down copper tube are removed from each cable end along a length very much greater than that required for said connection, the arch assembly is untwisted and the grooved rod is removed from each cable end along a length very much greater than that required for said connection, leaving the optical fibers and the carrier wire stripped;

b. the sheath and the sleeve are engaged on a cable end;

c. the two smooth rods are placed on the cable ends;

d. the optical fibers are welded together one-to-one and they are wound round the smooth rods on either side of their welds;

e. the resilient protective tapes are set in position on the fibers and then the split tubes are set in position on the tapes;

f. the sheath is brought back to the center of the connection, covering each end of the split tube, then each arch assembly is reformed over the sheath, and g. the sleeve is brought back to the center of the connection on the end of each arch assembly.

Preferably, the space left free between the ends of each arch assembly, the sheath and the sleeve as well as the ends of the sleeve is filled with glue.

BRIEF DESCRIPTION OF THE DRAWINGS

Both a connection in accordance with the invention for joining together two cable ends each having a return conductor and a protective thermoplastic sheath which surrounds said return conductor and a method of manufacturing said connection are described by way of example with reference to the accompanying drawings, in which:

FIGS. 1A and 1B are perspective views of two cable ends to be connected, showing their various components;

MORE DETAILED DESCRIPTION

Figure 2:
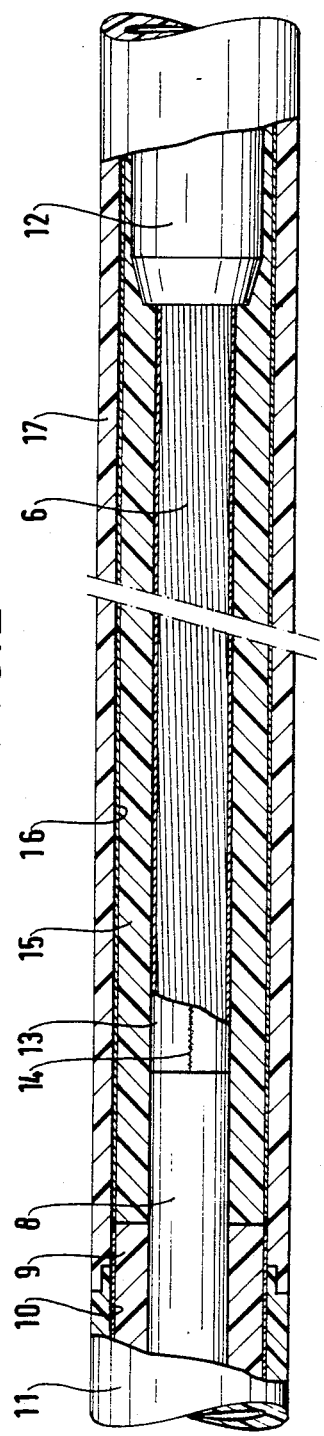
FIG. 2 is a partially cutaway elevation of a cable connection showing various reconstituted layers.

In FIGS. 1A and 1B, the end of each cable has an optical core 1, 1' constituted by a carrier wire 2, 2' covered by a helically grooved rod 3, 3' made of a plastics material in which optical fibers 4, 4' are received. Said optical core is covered by a protective tape 5, 5' then by an arch assembly 6, 6' made of steel wires and consisting of a first arch 6, 6'A and of a second arch 6B, 6'B. The ends of the wires are held clamped against the optical core by two regions of whipping or binding 7A, 7'A and 7B, 7'B to prevent said arch assembly from becoming untwisted and coming apart before the ends are connected together. A copper tube 8, 8' is drawn on the arch assembly and is covered by an insulating sheath 9, 9'. In the above embodiment, the cable has a return conductor 10, 10' covered with a protective sheath 11, 11'.

In FIG. 2, which shows the end of one of the cables, the arch assembly 6 is enclosed in a sleeve 12. The copper tube 8 drawn down on the arch is reconstituted by a copper tape 13 longitudinally welded at 14.

A thermoplastic moulding 15 connects the insulating sheath 9 of said cable end and the insulating sheath of the end of the other cable, not shown. In the above form of embodiment which includes a return conductor, a metal braiding 16 connects the return conductor 10 of said cable end and the conductor of the end of the other cable, not shown, and a heat-shrinkable sleeve 17 connects the protective sheath 11 of said cable end and the protective sheath of the end of the other cable, not shown.

Figure 3:
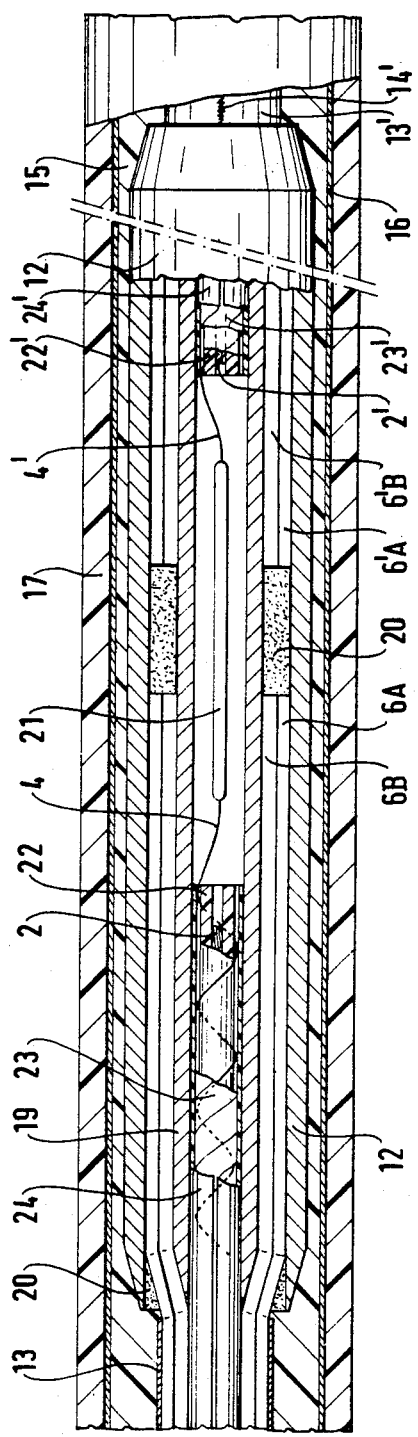
FIG. 3 illustrates in detail the connection shown in FIG. 2.

FIG. 3 shows the inside of the sleeve 12 and the various reconstituted layers. In said figure, the optical fibres 4, 4' are connected by welding and protected by individual sleeves 21.

The fibers 4 are wound round smooth rod 22 which is itself glued to the carrier wire 2 and they are protected by a tape 23 equivalent to the tape 5 of FIG. 1A. A split tube 24 covers the tape 23.

The same applies to the fibers 4' wound round a smooth rod 22' which is itself glued to the carrier wire 2' and protected by a tape 23' equivalent to the tape 23. A split tube 24' covers the tape 23'.

Both ends of each split tube 24, 24' are covered by sheaths 19. The ends of the arch assemblies are wound onto said sheath to reconstitute a cable. The sleeve 12 covers the ends of the arch assemblies and is filled with glue 20. Two longitudinally welded copper tapes 13, 13' on each side of the sleeve reconstitute the copper tubes 8, 8' drawn down over each cable end. A reconstitution moulding 15 made of a thermoplastic substance ensures the continuity of the insulating sheaths 9, 9' of each cable end. In said form of embodiment a longitudinally welded conductive metal tape 16 provides continuity of the return conductor 10, 10' and a heat shrinkable sleeve 17 provides continuity of the protective sheath 11, 11' at each cable end.

The connection described hereinabove is manufactured as follows:

The protective sheath 11, the return conductor 10, the insulating sheath 9 and the drawn down copper tube 8 are removed from each cable end along a length very much greater than that required for said connection.

The arch assembly 6 is untwisted and the rod 3 is removed from each cable end along a length greater than that required for said connection, leaving the optical fibers 4 and the carrier wire 2 stripped.

The sheath 19 and the sleeve 12 are engaged on a cable end.

The two smooth rods 22, 22' are placed on the two carrier wires 2, 2'.

The optical fibers are welded together one-to-one and each weld is protected by an individual sleeve 21 and the fibers are wound round each smooth strength member on either side of their welds The resilient tapes 23, 23' are set in position on the fibers then the split tubes are set in position on the tapes.

The sheath 19 is brought back to the centre of the connection, covering each end of the split tube, then each arch assembly is reformed over the sheath.

The sleeve 12 is brought back to the centre of the connection on the end of each arch assembly.

The space left free between the ends of each arch assembly, the sheath and the sleeve as well as the ends of the sleeve is filled with glue 20.

The drawn down copper tube 8, 8' is reconstituted up to the level of the sleeve 12 by placing two copper tapes 13, 13' on either side thereof, said copper tapes being welded longitudinally by two welds 14, 14'.

The continuity of the insulating sheath 9, 9' of each cable end is provided by a moulding 15 made of a thermoplastics substance along the whole length of the connection.

In said form of embodiment, the continuity of the return conductor on each cable end is provided by a longitudinally welded conductive metal tape 16 and the continuity of the protective sheath at each cable end is provided by a heat shrinkable sleeve 17.

Of course, without going beyond the scope of the invention, metal braid could be used to reconstitute the return conductors.

Also the invention can be applied to cables which do not have a return conductor, in which case the number of steps is reduced.

I claim:

1. A connection joining the ends of two under-water optical fiber cables, each cable comprising an optical core constituted by a carrier wire covered by a helically grooved plastics rod having optical fibers received in its grooves; a protective tape wrapped about the optical core; a steel wire arch assembly covering said tape; a copper tube drawn down on the arch assembly; and an insulating sheath made of a thermoplastic substance about said copper tube; the improvement wherein the connection comprises:
   a. plastics rods axially glued respectively to the ends of each cable carrier wire, the ends of the optical fibers being wound around said rods, said fibers being welded individually to each other and two tapes wrapped about said fibers on said rods for protecting said fibers;
   b. a split plastics tube covering the tape surrounded optical fibers with its ends overlying said rods carrying said wound optical fibers;
   c. a sheath covering said split plastics tube, the ends of each arch assembly being reconstituted around said sheath; and
   d. a sleeve glued and/or crimped onto the ends of said arch assemblies and extending therebetween.

2. A connection according to claim 1, wherein the space left free between the ends of each arch assembly, the sheath and the sleeve as well as the ends of the sleeve are filled with glue.

3. A connection according to claim 1, further including, on each side of the sleeve, two copper tapes welded longitudinally which reconstitute the drawn down copper tube over the connection.

4. A connection according to claim 3, further including a thermoplstic reconstitution moulding about said sleeve over the complete length of the connection and joined at opposite ends to said insulating sheaths of said cable ends, which moulding provides continuity of the insulating sheaths over the connection.

5. A connection according to claim 4, wherein each cable has a return conductor, wherein the connection further includes a longitudinally welded conductive metal tape integrated to said return conductors which provides continuity of the return conductor of each cable end.

6. A connection according to claim 5, wherein each cable has a protective sheath which surrounds the return conductor, wherein the connection further includes a heat shrinkable sleeve integrated to said protective sheaths for said cables which provides continuity of the protective sheath of each cable end.

7. A method of manufacturing a connection joining the ends of two under-water optical fiber cables, each cable comprising an optical core constituted by a carrier wire covered by a helically grooved plastics rod having optical fibers received in its grooves; a protective tape wrapped about the optical core; a steel wire arch assembly covering said tape; a copper tube drawing on the arch assembly; and an insulating sheath made of a thermoplastic substance about said copper tube; said method comprising the steps of:
a. removing the insulating sheath and the drawn down copper tube from each cable end along a length very much greater than that required for said connection, untwisting the arch assembly, removing the grooved rod from each cable end along a length very much greater than that required for said connection, thereby leaving the optical fibers and the carrier wire bare;
b. engaging the sheath on a cable end;
c. placing a smooth rod on each cable end;
d. welding the optical fibers together one-to-one and winding them round the smooth rods on either side of their welds;
e. setting the resilient protective tapes in position on the optical fibers, about said rods and then setting a split tube in position on the tapes;
f. applying a tubular insulating sheath to the center of the connection with ends thereof covering ends of the split tubes, and then reforming each arch assembly over the sheath; and
g. applying a sleeve to the center of the connection covering the ends of said arch assemblies and extending therebetween.

8. A manufacturing method according to claim 7, further comprising the step of filing the space left free between the ends of each arch assembly, the sheath and the sleeve as well as the ends of the sleeve with glue 20.

9. A manufacturing method according to claim 8, further comprising the steps of reconstituting the drawn down copper tube of each cable end up to the level of the sleeve by placing copper tapes on respective sides thereof, and welding said copper tapes longitudinally along seams defined by abutting edges of said copper tapes.

10. A manufacturing method according to claim 9, further comprising the step of providing continuity of the insulating sheath of each cable end by moulding a thermoplastics substance therebetween joining the ends of said cable sheaths.

11. A method according to claim 10, for use with cables each of which includes a return conductor, and wherein said method further comprises the step of providing continuity of the return conductor of each cable by integrating a longitudinally welded conductive metal tape to said return conductors.

12. A method according to claim 11, for use with cables each of which includes a protective sheath covering a return conductor, and wherein said method further comprises the step of providing continuity of the protective sheath of each cable end by integrating a heat-shrinkable sleeve to said protective sheaths.

* * * * *